United States Patent [19]

Frushour

[11] Patent Number: 5,011,509
[45] Date of Patent: Apr. 30, 1991

[54] COMPOSITE COMPACT WITH A MORE THERMALLY STABLE CUTTING EDGE AND METHOD OF MANUFACTURING THE SAME

[76] Inventor: Robert H. Frushour, P.O. Box 818, Plymouth, Mich. 48170

[21] Appl. No.: 390,204

[22] Filed: Aug. 7, 1989

[51] Int. Cl.5 ............................................. B24D 3/00
[52] U.S. Cl. .................................... 51/293; 51/295
[58] Field of Search ................................ 51/293, 295

[56] References Cited

U.S. PATENT DOCUMENTS

| | | | |
|---|---|---|---|
| 3,745,623 | 7/1973 | Wentorf, Jr. et al. | 29/95 B |
| 4,311,490 | 1/1982 | Bovenkerk et al. | 51/293 |
| 4,496,372 | 1/1985 | Almond et al. | 51/293 |
| 4,662,896 | 5/1987 | Dennis | 51/293 |
| 4,789,385 | 12/1988 | Dyer et al. | 51/295 |
| 4,802,895 | 2/1989 | Burnand et al. | 51/293 |
| 4,875,907 | 10/1989 | Phaal et al. | 51/293 |

Primary Examiner—William R. Dixon, Jr.
Assistant Examiner—Willie J. Thompson
Attorney, Agent, or Firm—Basile and Hanlon

[57] ABSTRACT

A compact blank for use in operations that require very high abrasion resistance and a thermally stable cutting edge is disclosed. The compact comprises a substrate formed of tungsten carbide or other hard material with a polycrystalline diamond layer bonded to the substrate. The diamond layer is fabricated by chemical vapor deposition and then subsequently bonded to the tungsten carbide substrate by the application of high pressure and high temperature at diamond stable conditions.

7 Claims, 1 Drawing Sheet

COMPOSITE COMPACT WITH A MORE THERMALLY STABLE CUTTING EDGE AND METHOD OF MANUFACTURING THE SAME

BACKGROUND OF THE INVENTION

1. Field of the Invention

The present invention relates to a sintered polycrystalline diamond composite for use in rock drilling, machining of wear resistant metals, and other operations which require the high abrasion resistance or wear resistance of a diamond surface. Specifically, this invention relates to such bodies which comprise a polycrystalline diamond layer attached to a cemented metal carbide substrate via processing at ultrahigh pressures and temperatures.

2. Prior Art

It is well known to sinter a mass of polycrystalline particles such as diamond or cubic boron nitride in the presence of a suitable solvent catalyst by means of a high pressure, high temperature apparatus to form a compact with good particle-to-particle bonding. While such compacts have good abrasion characteristics, they lack the required transverse rupture strength and are, therefore, not suitable for certain cutting operations due to the difficulty in attaching them to a tool holder which would provide the required mechanical strength. U.S. Pat. No. 3,745,623 U.S. Pat. No. Re. 32,380 solves this problem by sintering a mass of polycrystalline particles in conjunction with a tungsten carbide substrate to produce a composite compact in which the particles are directly bonded to each other and to a cemented carbide substrate. Such composite compacts are widely used in machining and drilling since the carbide substrate provides good mechanical support and can be clamped or brazed to a suitable tool holder or drilling bit.

Although compacts produced by these prior art techniques have excellent abrasion resistance and good mechanical strength, they are limited to applications where temperatures do not exceed 700° C. to 800° C. for excessive periods of time. This is a result of degradation by chemical reactivity and thermal expansion of the entrapped catalytic metals, such as cobalt or other group 8 metals which are used to synthesize diamond crystals and to sinter these crystals into a polycrystalline mass.

One solution to this problem is to form diamond or diamond-like carbon films on substrate metals, which have high transverse rupture strength, by various chemical vapor deposition methods. This produces a carbon surface that does not contain catalytic or other reactive metals in its interstices. At present, many scientists throughout the world are performing research and development to produce cutters of this type. However, the problem still to be solved is obtaining a strong bond between the diamond or diamond-like carbon and the substrates. State of the art substrates coated in this manner show widely varied bond strengths which are, at best, not suitable for harsh industrial applications, such as rock drilling.

SUMMARY OF THE INVENTION

According to the invention, a dense well-bonded thermally stable diamond or diamond-like carbon layer is directly bonded to a strong cobalt cemented tungsten carbide support. The first step is to produce a sheet or layer of diamond or diamond-like carbon by chemical vapor deposition in a thickness sufficient to allow handling without damage, and then to machine or cut the diamond sheet to fit a tungsten carbide support piece. The diamond is then positioned directly upon the top of the polished and cleaned support piece, loaded into a cell, and placed in a high pressure, high temperature press and taken to diamond stable conditions. At these conditions a strong bond is formed between the carbon, cobalt, and tungsten atoms. Compacts so produced can be used in machining or drilling applications where operating temperatures exceed well beyond 700° C.

DESCRIPTION OF THE PREFERRED EMBODIMENT

Figure 1:
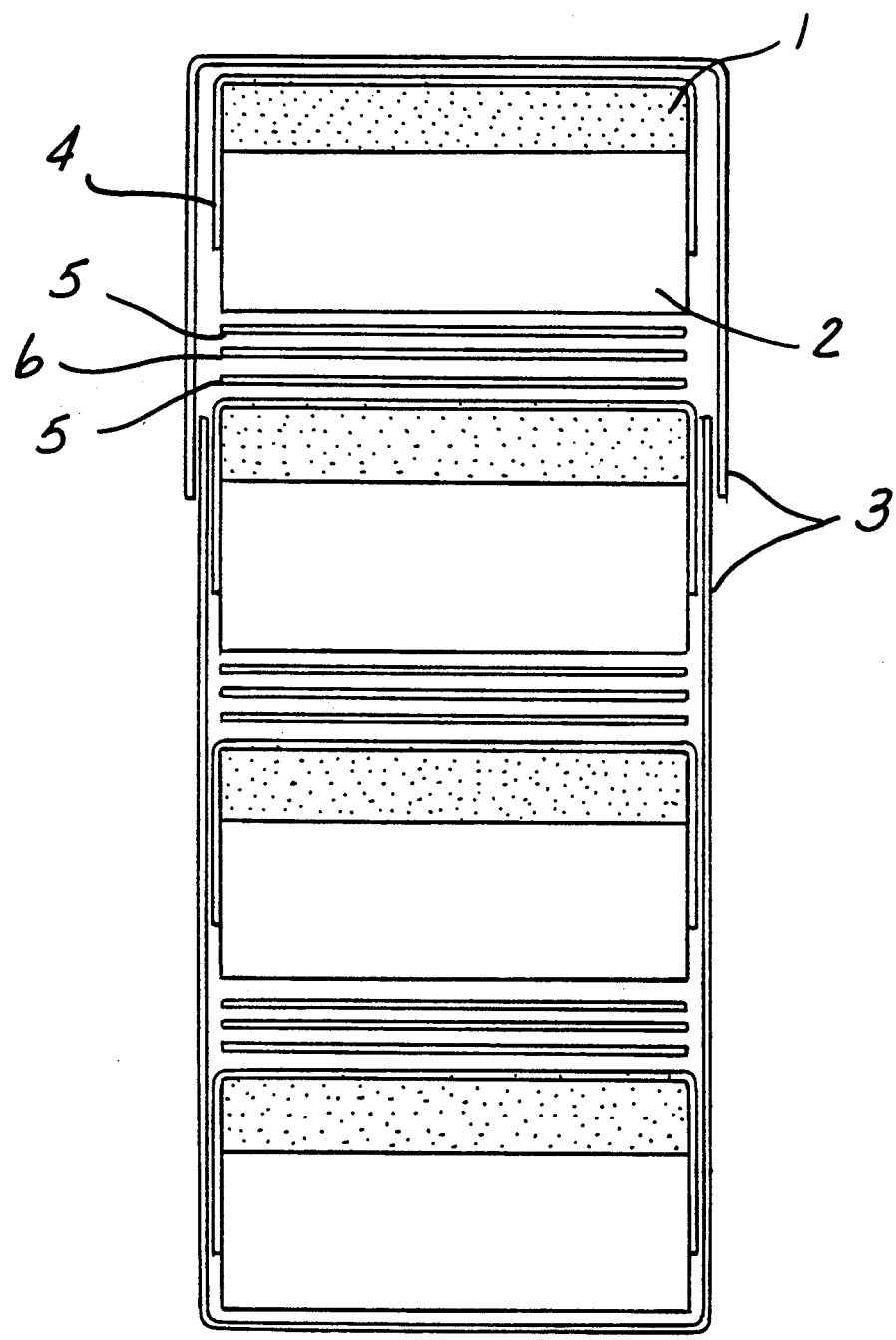
FIG. 1 is a cross-sectional view of the inner portion of a high pressure cell which may be used to make a diamond compact according to the present invention.

A diamond or diamond-like carbon sheet of material is grown on a suitable substrate by chemical vapor deposition. This carbon film can be grown by any of the CVD techniques now being used, such as plasma assisted or heated filament methods. These low pressure methods of making the diamond layer are important since they can produce a strongly bonded polycrystalline diamond mass without the use of catalytic materials. Thus, this diamond material shows a much higher degree of thermal stability than prior state-of-the-art techniques using high a pressure, high temperature apparatus.

This film of diamond is grown upon a substrate material, such as graphite, which can later be dissolved or etched away to leave only the pure polycrystalline diamond or diamond-like mass.

The polycrystalline diamond layer is then fabricated into circles, triangles, squares, or other shapes by cutting with a laser such that these shapes will exactly fit the mass of tungsten carbide material which is to be used as a mechanical support.

Pre-cemented tungsten carbide substrates should be precision ground so that the perimeter of the substrate matches those shapes cut from the diamond film. One surface of this substrate should be ground flat and smooth for attachment to the diamond film.

In the following disclosures and claims, it should be understood that the cemented metal carbide substrate refers to a carbide of one of the group IVB, VB, or VIB metals which is pressed and sintered in the presence of a binder of cobalt, nickel, or iron and the alloys thereof.

The diamond or diamond-like carbon layer 1 is then placed directly upon the ground-flat surface of the substrate 2 and placed into a protective metal cup. (See FIG. 1.)

FIG. 1 shows a cross section of the inner portion of an assembly which may be employed to make the composite polycrystalline diamond body of the present invention. The enclosure 3 is cylindrical in shape and is designed to fit within a central cavity of a ultrahigh pressure and temperature cell, such as that described in U.S. Pat. No. 3,745,623 or U.S. Pat. No. 3,913,280.

The enclosure 3 is composed of a metal, such as zirconium, molybdenum, or tantalum, which is selected because of its high melting temperature and designed to protect the reaction zone from moisture and other harmful impurities present in a high pressure and high temperature environment. The cups 4 are also made of a metal, such as zirconium, molybdenum, or tantalum, and designed to provide additional protection to the sample if the outer enclosure should fail. It is preferable that one of the metals, used for the enclosure 3 or the cups 4 be zirconium since this material will act as a "getter" to remove oxygen and other harmful gases which may be present. The discs 5 are fabricated from either zirconium or molybdenum and disc 6 is composed of fired mica, salt, boron nitride, or zirconium oxide and is used as a separator so that the composite bodies can be easily divided.

Typically, the metal carbide support 2 will be composed of tungsten carbide with a 13 weight percent cobalt binder.

The entire cell is subjected to pressures in excess of 40 K-bars and heated in excess of 1400° C. for a time of 10 minutes. Then the cell is allowed to cool enough so that the diamond does not back-convert to graphite when the pressure is released.

After pressing, the samples are lapped and ground to remove all the protective metals 3,4, and 5.

Finished parts are mounted on to tool shanks or drill bit bodies by well-known methods, such as brazing, LS bonding, mechanical interference fit, etc., and find use in such applications as, machining high silicon aluminum, brass, composite materials, rock, or any application where excessive temperatures may result in thermal degradation of the diamond cutting edge.

EXAMPLES

A polycrystalline diamond layer 0.040 -inch thick is deposited on a graphite substrate by means of a hot filament chemical vapor deposition method using methane as a carbon source and hydrogen to assist the formation of diamond ($sp^3$) bonding. The graphite is exfoliated from the diamond layer using a 1:10 mixture of hot, concentrated nitric and sulfuric acids. The diamond is then cut into a circular discs 0.530 -inch diameter using a YAG laser. The discs are then placed onto a pre-sintered grade 55A tungsten carbide substrate. the assembly is then loaded into a high pressure cell and subjected to 45 kilobars for ten minutes at 1500° C. The temperature is allowed to cool to 900° C. and then both the pressure and temperature are lowered to room conditions simultaneously.

The composite bodies are removed from the other cell components and then lapped and ground to final dimensions.

Testing by use of these composites to machine hard rock, such as Barre granite, can be performed to show that the abrasive wear resistance is superior to that of prior art composites fabricated by methods taught in U.S. Pat. No. Re. 32,380. In performing this test, one should compare test results by machining without the use of cutting fluids used to cool the cutting tool.

What is claimed is:

1. A composite body comprising:
   a diamond material layer formed by chemical vapor deposition as a single, well bonded body and having a first surface;
   a substrate; and
   the first surface of the diamond material layer and the substrate being bonded together under high pressure and high temperature.

2. The composite body of claim 1 wherein the diamond layer has a thickness greater than 0.001 inch.

3. A method of manufacturing a composite body comprising the steps of:
   forming a diamond material layer by chemical vapor deposition as a single, well bonded body on a graphite substrate;
   mounting the diamond material layer on a cemented metal carbide substrate; and
   subjecting the diamond material layer and the cemented metal carbide substrate to high pressure and high temperature to form a bond between the diamond material layer and the cemented metal carbide substrate.

4. The method of claim 3, in which the pressure is at least 40 kilobars and the temperature is above 1250° C.

5. The method of claim 3, wherein the diamond material layer is formed by depositing the diamond material on a material other than graphite subsequently removed from the diamond material.

6. The method of claim 3 in which the diamond layer has a thickness greater than 0.001 inch.

7. A composite body formed by the process comprising the steps of:
   forming a diamond material layer by chemical vapor deposition as a single, well bonded body on a substrate;
   mounting the diamond material layer on a cemented metal carbide substrate; and
   subjecting the diamond material layer and the cemented metal carbide substrate to high pressure and high temperature to form a bond between the diamond material layer and the cemented metal carbide substrate.

* * * * *